United States Patent [19]

Okada et al.

[11] Patent Number: 4,844,590

[45] Date of Patent: Jul. 4, 1989

[54] METHOD AND APPARATUS FOR DRIVING FERROELECTRIC LIQUID CRYSTAL DEVICE

[75] Inventors: Shinjiro Okada, Kawasaki; Masahiko Enari, Yokohama, both of Japan

[73] Assignee: Canon Kabushiki Kaisha, Tokyo, Japan

[21] Appl. No.: 865,867

[22] Filed: May 22, 1986

[30] Foreign Application Priority Data

May 25, 1985 [JP] Japan ............................... 60-111371
Jul. 12, 1985 [JP] Japan ............................... 60-152321

[51] Int. Cl.[4] .......................... G02F 1/13; G09G 3/36

[52] U.S. Cl. ................................ 350/350 S; 350/333; 350/332; 340/805

[58] Field of Search .................... 350/350 S, 332, 333; 340/805, 811, 713, 714, 802, 784

[56] References Cited

U.S. PATENT DOCUMENTS

| | | | |
|---|---|---|---|
| 4,317,115 | 2/1982 | Kawakami et al. | 340/805 |
| 4,508,429 | 4/1985 | Nagae et al. | 350/350 S |
| 4,548,476 | 10/1985 | Kaneko | 350/350 S |
| 4,556,880 | 12/1985 | Hamada | 340/805 |
| 4,638,310 | 1/1987 | Ayliffe | 340/805 |
| 4,640,582 | 2/1987 | Oguchi et al. | 350/333 |
| 4,655,561 | 4/1987 | Kanbe et al. | 350/333 |

FOREIGN PATENT DOCUMENTS

| | | | |
|---|---|---|---|
| 0000826 | 1/1979 | Japan | 340/802 |

*Primary Examiner*—Stanley D. Miller
*Assistant Examiner*—Tai van Duong
*Attorney, Agent, or Firm*—Fitzpatrick, Cella, Harper & Scinto

[57] ABSTRACT

A driving method for a ferroelectric liquid crystal device having a matrix electrode arrangement comprising a plurality of scanning lines and a plurality of data lines, and a ferroelectric liquid crystal disposed between the scanning lines and the data lines and having a threshold voltage for swtiching, a picture element being formed at each intersection of the scanning lines and the data lines. The driving method has a previous scanning period in which a prescribed number of scanning lines are scanned line-sequentially; a subsequent scanning period in which a prescribed number of subsequent scanning lines are scanned line-sequentially; and an auxiliary signal-application period provided between the previous and subsequent scanning periods, in which an auxiliary signal below the threshold voltage is applied to all or a prescribed part of the picture elements.

4 Claims, 10 Drawing Sheets

METHOD AND APPARATUS FOR DRIVING FERROELECTRIC LIQUID CRYSTAL DEVICE

FIELD OF THE INVENTION

The present invention relates to a method and an apparatus for driving a liquid crystal display device, particularly a method and an apparatus for driving a liquid crystal display device (hereinafter sometimes abbreviated as "LCD device") using a ferroelectric liquid crystal (hereinafter sometimes abbreviated as "FLC").

In place of the nematic liquid crystal which have been frequently used heretofore, a development of FLC device has called much attention in recent years. An FLC device is expected to provide an LCD device of a high-order time division, as it is provided with bistability. Further, different from the conventional TN (twisted nematic) liquid crystal devices, the response speed of an ferroelectric liquid crystal device is determined by the product of a spontaneous polarization and an electric field intensity, and the threshold relating to the response is determined based on the product of the intensity and the application time of the field intensity.

A bistable FLC device has been disclosed by Clark and Lagerwall in U.S. Pat. No. 4,367,924. Further, methods for line-sequentially driving an FLC device have been disclosed, for example, by Kaneko in U.S. Pat. No. 4,548,476 and Kanbe et al in U.K. Patent No. 2141279A.

However, the bistable FLC device still involves some problem. FIG. 9 shows a threshold characteristic of a bistable cell of an ordinary FLC. Referring to FIG. 9, when a writing pulse with a pulse duration of $t_0$ (ms) and a pulse height of $V_0$ (volt) is used and a voltage of $-1/a\ V_0$ is continually applied to a picture element for a period of $n \times t_0$ (ms), a crosstalk phenomenon that a written display state (e.g., "white") is inverted to another display state (e.g., "black") can occur, wherein n is a number of consecutively applied identical data signals, and 1/a denotes a bias ratio. This means that when an FLC device is driven according to a line-sequential driving scheme, a "white" display state written into a picture element on a data line in a selected scanning period can be inverted to a "black" display state while a "black" signal is continually applied to the picture element in subsequent non-selected scanning periods.

SUMMARY OF THE INVENTION

An object of the present invention is to provide a method for driving a ferroelectric liquid crystal device having resolved the above problems and a apparatus therefor.

According to a principal aspect of the present invention, there is provided a driving method for a ferroelectric liquid crystal device having a matrix electrode arrangement comprising a plurality of scanning lines and a plurality of data lines, and a ferroelectric liquid crystal disposed between the scanning lines and the data lines and having a threshold voltage for switching. A picture element is formed at each intersection of the scanning lines and the data lines. The driving method has a previous scanning period in which a prescribed number of scanning lines are scanned line-sequentially, a subsequent scanning period in which a prescribed number of subsequent scanning lines are scanned line-sequentially, an auxiliary signal-application period is provided between the previous and subsequent scanning periods, in which an auxiliary signal below the threshold voltage is applied to all or a prescribed part of the picture elements. Particularly, an alternating voltage such as an AC voltage is applied to the picture elements in the auxiliary signal application period.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

The ferroelectric liquid crystal to be used in a driving method according to the present invention may preferably be one showing bistability with respect to an electric field applied thereto, i.e., one showing either a first optically stable state or a second optically stable state depending on an electric field applied thereto.

Preferable ferroelectric liquid crystals having bistability which can be used in the driving method according to the present invention are smectic, particularly chiral smectic, liquid crystals having ferroelectricity. Among them, chiral smectic C (SmC*)-or H (SmH*)-phase liquid crystals are suitable therefor. These ferroelectric liquid crystals are described in, e.g., "LE JOURNAL DE PHYSIQUE LETTERS" 36 (L-69), 1975 "Ferroelectric Liquid Crystals"; "Applied Physics Letters" 36 (11) 1980, "Submicro Second Bistable Electrooptic Switching in Liquid Crystals"; "Kotai Butsuri (Solid State Physics)" 16 (141), 1981 "Liquid Crystal", etc. Ferroelectric liquid crystals disclosed in these publications may be used in the present invention.

More particularly examples of ferroelectric liquid crystal compound used in the method according to the present invention are decyloxybenzylidene-p'-amino-2-methylbutyl-cinnamate (DOBAMBC), hexyloxybenzylidene-p'-amino-2-chloropropylcinnamate (HOBACPC), 4-o-(2-methyl)-butylresorcylidene-4'-octylaniline (MBRA8), etc.

When a device is constituted by using these materials, the device may be supported with a block of copper, etc., in which a heater is embedded in order to realize a temperature condition where the liquid crystal compounds assume an SmC*- o SmH*-phase.

Figure 10:
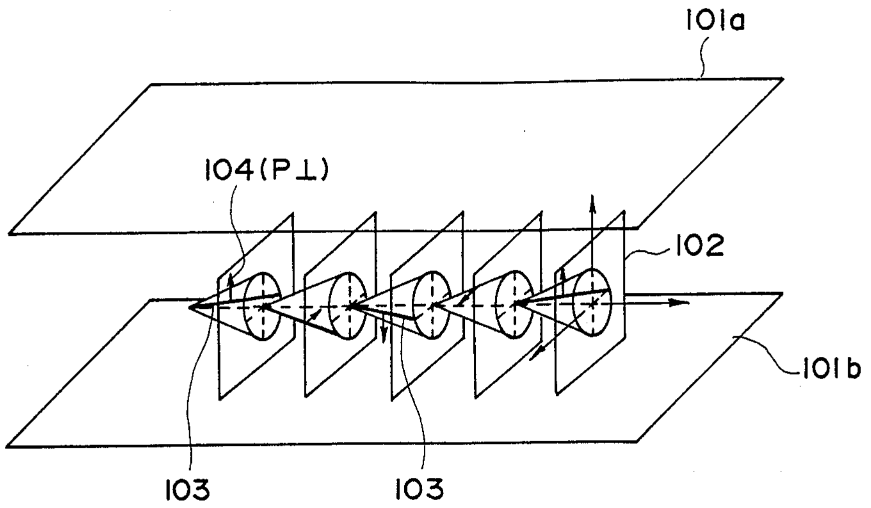
FIGS. 10 and 11 are schematic perspective views for illustrating the operation principle of an FLC cell used in the present invention.
Figure 11:
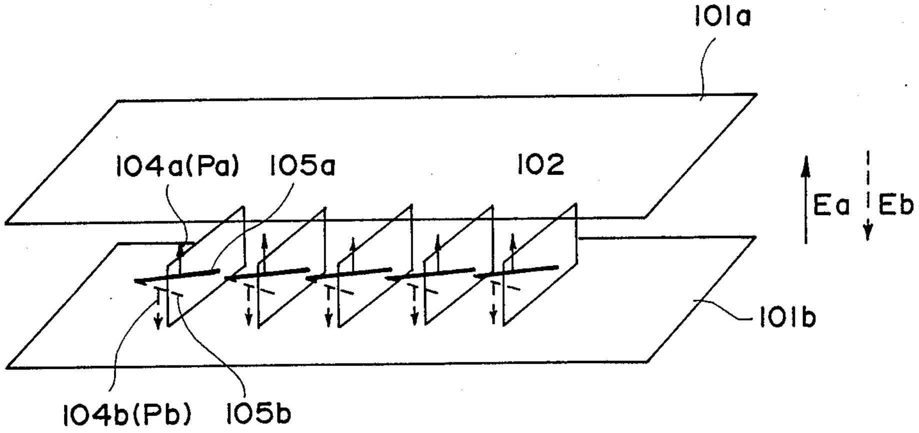

Referring to FIG. 10, an example of an FLC cell is schematically shown. Reference numerals **101*a* and 101*b*** denote base plates (glass plates) on which a transparent electrode of, e.g., $In_2O_3$, $SnO_2$, ITO (Indium Tin Oxide), etc., is disposed, respectively. A liquid crystal of an SmC*-phase in which liquid crystal molecular layers 102 are oriented perpendicular to surfaces of the glass plates is hermetically disposed therebetween. A full line 103 shows liquid crystal molecules. Each liquid crystal molecule 103 has a dipole moment ($P_\perp$) 104 in a direction perpendicular to the axis thereof. When a voltage higher than a certain threshold level is applied between electrodes formed on the base plates 101*a* and 101*b*, a helical structure of the liquid crystal molecule 103 is loosened to change the alignment direction of respective liquid crystal molecule 103 so that the dipole moments ($P_\perp$) 104 are all directed in the direction of the electric field. The liquid crystal molecules 103 have an elongated shape and show refractive anisotropy between the long axis and the short axis thereof. Accordingly, it is easily understood that when, for instance, polarizers arranged in a cross nicol relationship, i.e., with their polarizing directions crossing each other, are disposed on the upper and the lower surfaces of the glass plates, the liquid crystal cell thus arranged functions as a liquid crystal optical modulation device of which optical characteristics vary depending upon the polarity of an applied voltage. Further, when the thickness of the liquid crystal cell is sufficiently thin (e.g., 1 μ), the helical structure of the liquid crystal molecules is released or loosened without application of an electric field whereby the dipole moment assumes either of the two states, i.e., Pa in an upper direction 104*a* or Pb in a lower direction 104*b* as shown in FIG. 11. When electric field Ea or Eb higher than a certain threshold level and different from each other in polarity as shown in FIG. 11 is applied to a cell having the abovementioned characteristics, the dipole moment is directed either in the upper direction 104*a* or in the lower direction 104*b* depending on the vector of the electric field Ea or Eb. In correspondence with this, the liquid crystal molecules are oriented in either of a first stable state 105*a* and a second stable state 105*b*.

An advantage accompanying the use of such an FLC device as an optical modulation element, is that the response speed is quite fast. Another advantage is that the orientation of the liquid crystal shows bistability. Referring to FIG. 11, when the electric field Ea is applied to the liquid crystal molecules, they are oriented to the first stable state 105*a*. This state is kept stable even if the electric field is removed. On the other hand, when the electric field Eb of which direction is opposite to that of the electric field Ea is applied thereto, the liquid crystal molecules are oriented to the second stable state 105*b*, whereby the directions of molecules are changed. Likewise, the latter state is kept stable even if the electric field is removed. Further, as long as the magnitude of the electric field Ea or Eb being applied is not above a certain threshold value, the liquid crystal molecules are placed in the respective orientation states. In order to effectively realize high response speed and bistability, it is preferable that the thickness of the cell is as thin as possible and generally 0.5 to 20 μ, preferably 1 to 5 μ. An LC-electrooptical apparatus having a matrix electrode structure using such an FLC is disclosed in the above mentioned U.S. Pat. No. 4,367,924 to Clark and Lagerwall.

Figure 1:
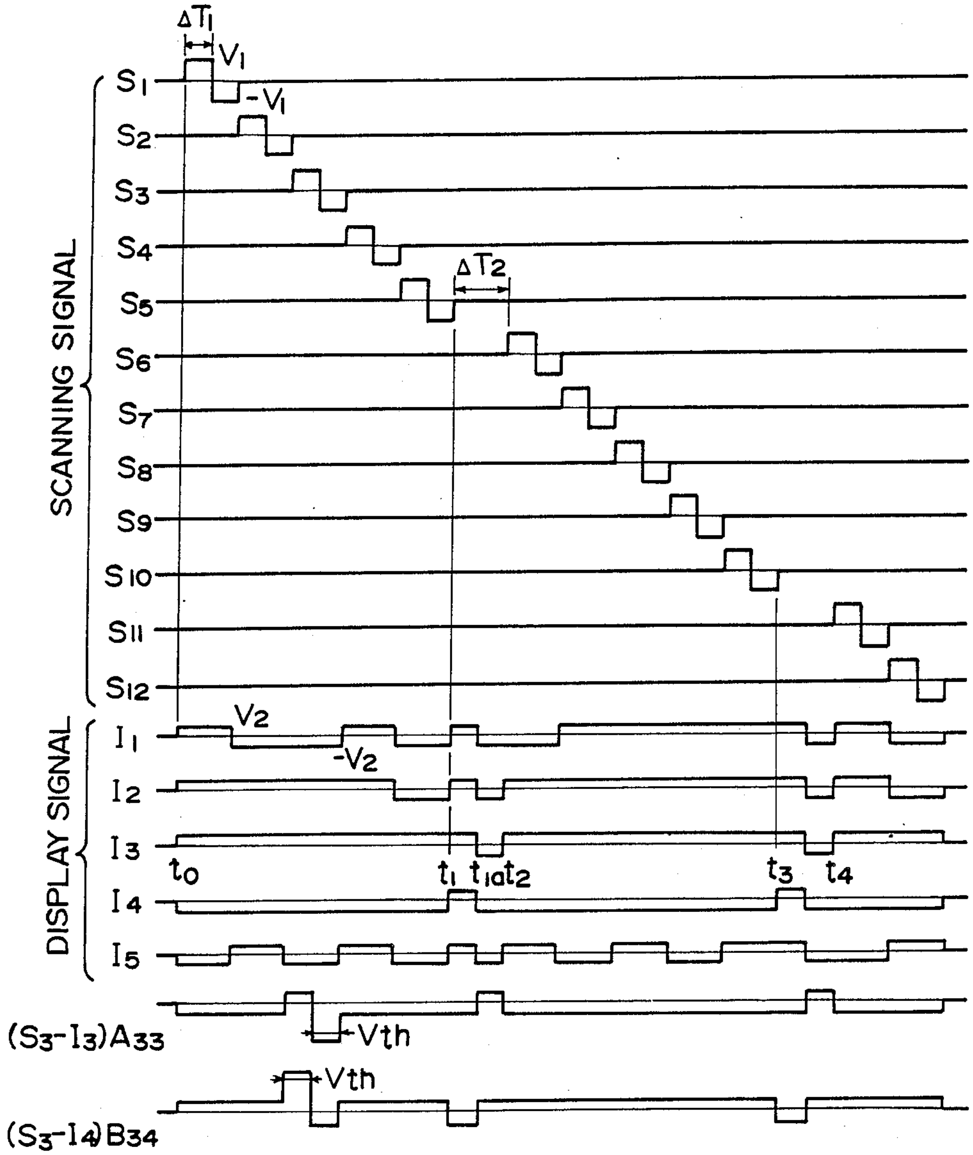
FIG. 1 is a time chart for an embodiment according to the present invention.
Figure 2:
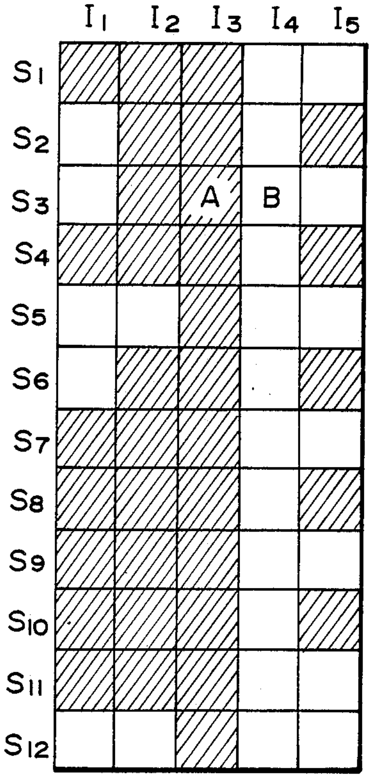
FIG. 2 is a plan view of a matrix panel.

FIG. 1 is a time chart showing an example of line-sequential scanning according to a driving scheme of the present invention, and FIG. 2 is a plan view of an example of a matrix panel written by the scanning. Referring to FIGS. 1 and 2, $S_1$–$S_{12}$ indicate scanning signals applied to the corresponding scanning lines and $I_1$–$I_5$ indicate display signals applied to the corresponding signal lines. As shown in FIG. 1, the scanning signals $S_1$–$S_{12}$ are line-sequentially applied and the display signals $I_1$–$I_5$ applied in synchronism with the scanning signals to provide a display state as shown in FIG. 2, wherein a hatched portion is assumed to be a picture element displaying "black" (first state) written by a positive electric field and a white portion is assumed to be a picture element display "white" (second state) written by a negative electric field. Picture elements A and B are taken as examples, and their locations are denoted by Aij and Bij, wherein the suffixes i and j mean that the picture element in question is on an i-th row and a j-th column. The voltage waveforms applied to picture elements A33 and B34 shown in FIG. 2 are shown at the lowermost portion of FIG. 1. The voltage values are calculated by subtracting a data signal Ij from a scanning signal Si, so that ($S_3$–$I_3$) for a picture element $A_{33}$ and ($S_3$–$I_4$) for $B_{34}$.

When a pulse voltage of $V_1+V_2$ with a pulse duration of $\Delta T_1$ is used for writing, a voltage ($V_2$ or $-V_2$) as shown at $I_1$–$I_5$ is applied even to non-selected points (picture elements) as will be apparent from the voltage waveforms shown at $A_{33}$ and $B_{34}$ in FIG. 1. The voltage applied to the non-selected points is not uniform but is different according to a display state concerned. More specifically, for a signal column $I_3$ wherein all the picture elements on the column are written in "black", a display signal voltage of $V_2$ is continually applied, while for a signal column $I_4$ on which all the picture elements are written in "white", a negative voltage of $-V_2$ is continually applied. As a result, a reverse bias voltage of $+V_2$ or $-V_2$ is continually applied to respective elements on these columns for a long period other than the scanning selection period. The reverse voltage, when applied for a period exceeding a certain level, can destroy the display. For this reason, the application of the bias voltage should be interrupted by applying an auxiliary signal to picture elements based on those picture elements on signal columns such as $I_3$ and $I_4$ where the bias voltage is applied for a longest period. For example, if the tolerable time limit of a liquid crystal material used is ($t_{1a}-t_0$) for the reverse bias voltage of $-V_2$ as shown in FIG. 1, this means that a time for writing 5 consecutive lines on a single column is an upper limit, and if one state is consecutively written in more than 5 picture elements on the same column, there is a possibility that the reverse bias voltage applied to the non-selected points is not tolerable. In order to resolve this problem, such continuous application of reverse bias voltage exceeding the tolerable limit may be obviated by applying a prescribed auxiliary signal to all the signal lines to which a data signal is applied after selection of 5 scanning lines, regardless of what types of image signals are applied to the data signal columns $I_1$–$I_5$. Since the reverse voltage can have opposite polarities, as is $+V_2$ for $I_3$ and $-V_2$ for $I_4$, the auxiliary signal may preferably comprise an AC waveform. In the embodiment shown in FIG. 1, for example, there is used an AC rectangular wave with a frequency or $1/\Delta T_2$ and a cycle or application time $\Delta T_2$ which satisfies $\Delta T_2 \geqq \Delta T_1$ wherein $\Delta T_1$ is the pulse duration of the scanning signal.

The tolerable limit of a reverse bias voltage application varies depending on a particular liquid crystal material and a particular cell used. In a case where DOBAMBC is incorporated in a cell having rubbed polyimide coating films inside thereof and a gap of about 1.8 μm and a writing pulse of 42 V (volts) and 2 ms (milliseconds) is used with a $\frac{1}{3}$ level (14 V) of a bias voltage, the tolerable limit for the reverse voltage (14 V) is of the order of 6 ms.

Figure 3:
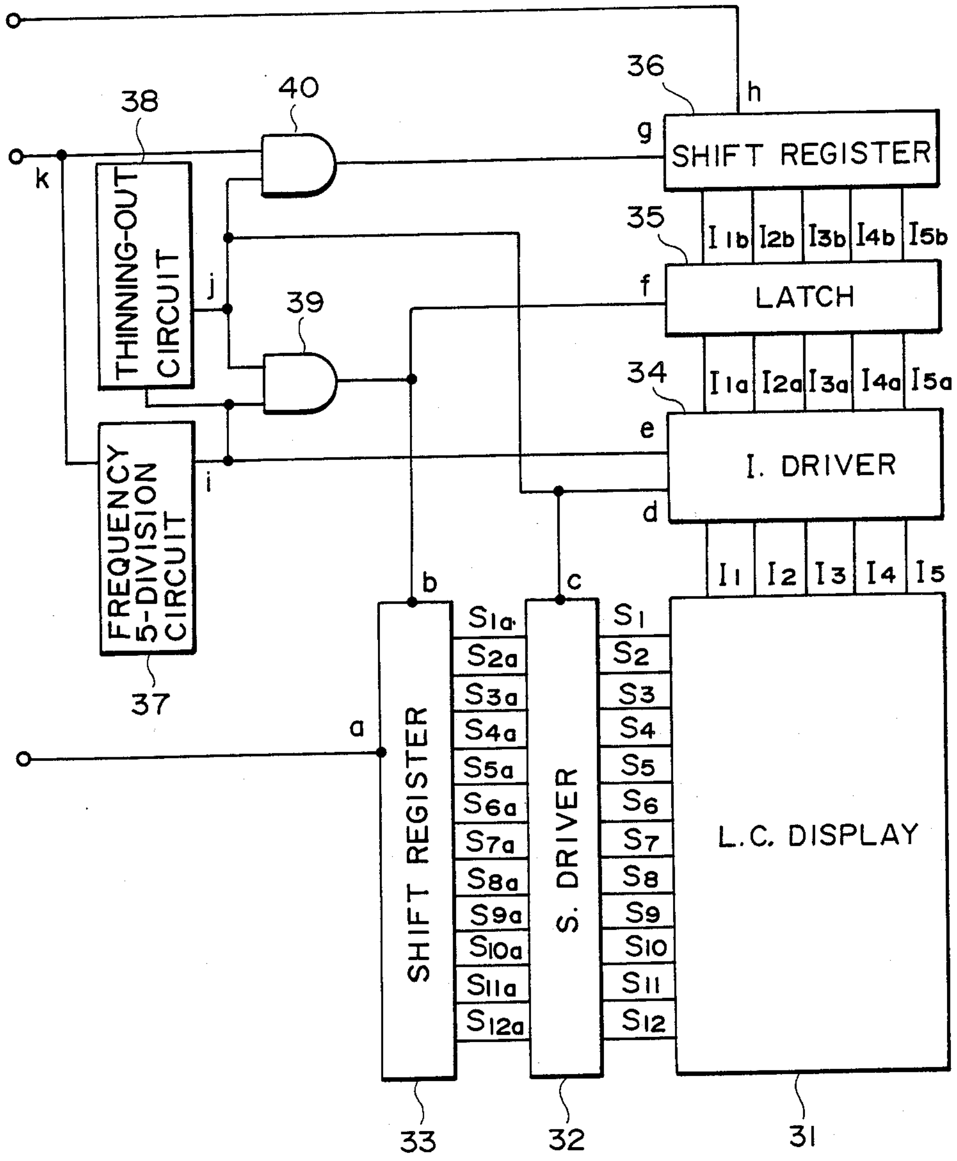
FIG. 3 is a block diagram of a driving circuit therefor.

FIG. 3 is a block diagram of an embodiment of a driving circuit for the above described LCD panel of $5\times12$ picture elements. Referring to FIG. 3, the driving circuit comprises an LCD panel 31, a scanning signal line driver circuit 32 connected to the LCD panel 31, a shift register 33 for controlling the line-sequential scanning thereof, and a display signal line driver 34 so as to be adapted for matrix driving. The shift register 33 is provided with a serial signal input terminal a and a clock pulse input terminal b and imparts a + (positive) polarity when a clock pulse input is "high" or a − (negative) polarity when a clock pulse input is "low". The scanning line driver 32 is provided with a scanning level-determining signal input terminal c in addition to input terminals for the scanning signals $S_{1a}$–$S_{12a}$. When the scanning level-determining signal is "high", scanning signals $S_{1a}S_{12a}$ at their "high level" are supplied through the scanning line driver 32,. which scanning signals are alternate voltage signals alternating between $+V_1$ volts and $-V_1$ volts corresponding to the "high" and "low" levels of the clock pulses from the input terminal b. On the other hand, the low level of the scanning signals $S_{1a}$–$S_{12a}$ is set at 0 volt. Further, in the present invention, 0 volt is supplied to the scanning line driver 32 at the timing of thinning-out as will be described hereinafter, so that 0 volts are supplied irrespective of the level of scanning signals $S_{1a}$–$S_{12a}$ when the input of the scanning level-determining signal is at the "low" level.

The display signal line driver 34 is provided with an output control signal input terminal d and an output-forcing data input terminal e in addition to the input terminals for the display signals $I_{1a}$–$I_{5a}$. When the output control signal from the terminal d is "high", the driver 34 supplies an alternate voltage signal alternating between $+V_2$ and $-V_2$ volts corresponding to the high and low levels of the display signals $I_{1a}$–$I_{5a}$. On the other hand, when the output control signal from the terminal d is "low", a signal of $+V_2$ volt or $-V_2$ volt is supplied corresponding to the high or low level of the output-forcing data from the terminal e and irrespective of the level of the display signals $I_{1a}$–$I_{5a}$.

To the display signal driver 34 are connected a latch 35 and a shift register 36. The latch 35 is provided with a clock pulse input terminal f, latches display signal input data $I_{1b}$–$I_{5b}$ at the rising of clock pulse inputs, and supplies outputs $I_{1a}$–$I_{5a}$ to the display signal driver 34. The shift register 36 is provided with a clockpulse input terminal f, and a serial signal input terminal h and distributes display signals from the serial signal input terminal h to the respective signal lines in phase with the clock pulse inputs.

Figure 4:
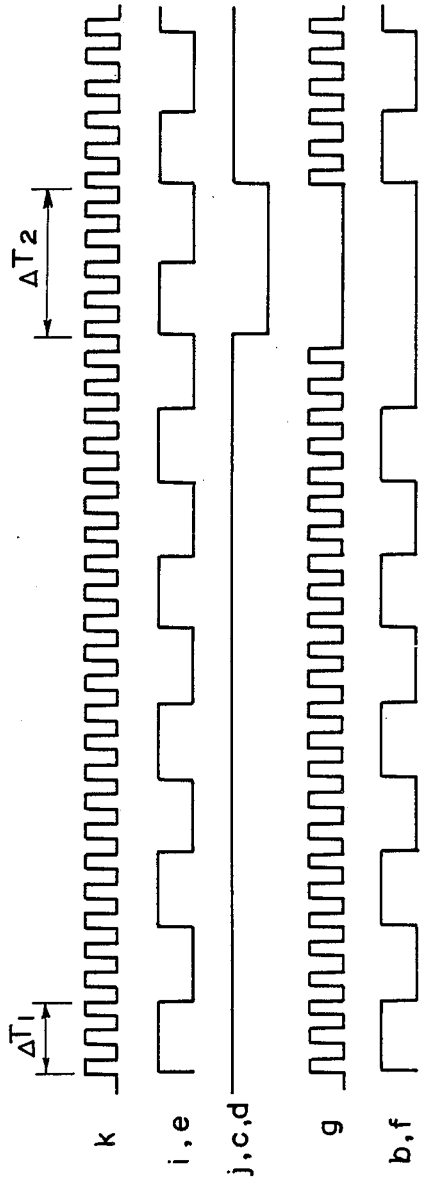
FIG. 4 is a timing chart therefor.

Referring to FIG. 3, there is provided a frequency divider (5-division) circuit 37 having an output terminal i divided into branch lines, one being directly connected to the above mentioned output-forcing data input terminal e of the display signal line driver 34, another branch line is connected as an input line to a thinning-out circuit 38, where a control signal for thinning-out the input signal one of 5 times (for example, the rate of thinning can be set basically as desired) is issued. The output terminal j of the thinning-out circuit 38 is connected to an AND gate 39 to which the output from the frequency divider 37 is also supplied. The signal on output terminal j is also supplied to an AND gate 40 to which the timing input before the frequency division is also supplied. The output of the AND gate 39 is supplied to two clock pulse input terminals b and f. The output of the AND gate 40 is supplied to the clock pulse input terminal g of the display signal side shift register 36. Further, the output of the thinning-out circuit 38 is also directly supplied to the scanning level-determining signal input terminal c of scanning signal line driver 32 and the output control signal input terminal d of display signal line driver 34. FIG. 4 is a time chart showing the timing at the respective parts in the circuit shown in FIG. 3. As shown at b and g in FIG. 4, thinned clock pulses are applied to both the scanning side and display side shift registers, so that data transfer is interrupted during the $\Delta T_2$ period. During this period, the output level-determining signal input from the terminal c is "low", so that the outputs $S_1$–$S_{12a}$ from the scanning signal line driver 32 are all 0 volt. On the other hand, as the output control signal input from the terminal is also "low", the output from the display signal line driver 34 once rises to $+V_2$ volts corresponding to the output-forcing data from the terminal e and then becomes $-V_2$ volt. After the lapse of the $\Delta T_2$ period, data transfer is resumed to effect liquid crystal display. The interruption-resumption is effected once for the 5 times of the scanning signal shift operation, whereby the operation is explained with reference to FIG. 1 may be realized.

In the above embodiment, the auxiliary signal is applied to the display signal line side. Needless to say, such an auxiliary signal may alternatively be applied to the scanning signal line side or may be applied to both the display signal lineside and the scanning signal line side in order to effect the driving method according to the invention.

In the above driving system, the prescribed or tolerable number of selection lines requiring a time of auxiliary signal application is set to such a value that the time required for line-sequential scanning of the number of scanning lines does not exceed the tolerable limit of time during which the liquid crystal material withstands the application of a reverse bias voltage. The auxiliary signal is required to have a larger pulse duration than the pulse duration of the scanning signal. A rectangular waveform signal may ordinarily be used without any problem and an AC signal may preferably be used as the auxiliary signal in order to be suitably used for either polarity of reverse bias voltage.

As stated above, according to the present invention, a desired waveform of auxiliary signal is applied to all the picture elements at a prescribed occasion or frequency, a reverse bias voltage due to a display signal is prevented from being applied continuously even during a non-selection period in a line-sequential scanning operation.

In another embodiment according to the present invention, there may be used a driving apparatus for line-sequentially driving a ferroelectric liquid crystal device having a matrix electrode arrangement comprising a plurality of scanning lines and a plurality of data lines, and a ferroelectric liquid crystal disposed between the scanning lines and the data lines, a picture element being defined at each intersection of the scanning lines and the data lines. The apparatus comprises detection means for detecting data signals applied to the data lines and issuing a detection signal when consecutive data signals of the same type are applied to a data line. Also included is a means for applying an auxiliary signal having an opposite polarity to that of the consecutively applied data signal and having a value below a threshold voltage to the data line.

Figure 5:
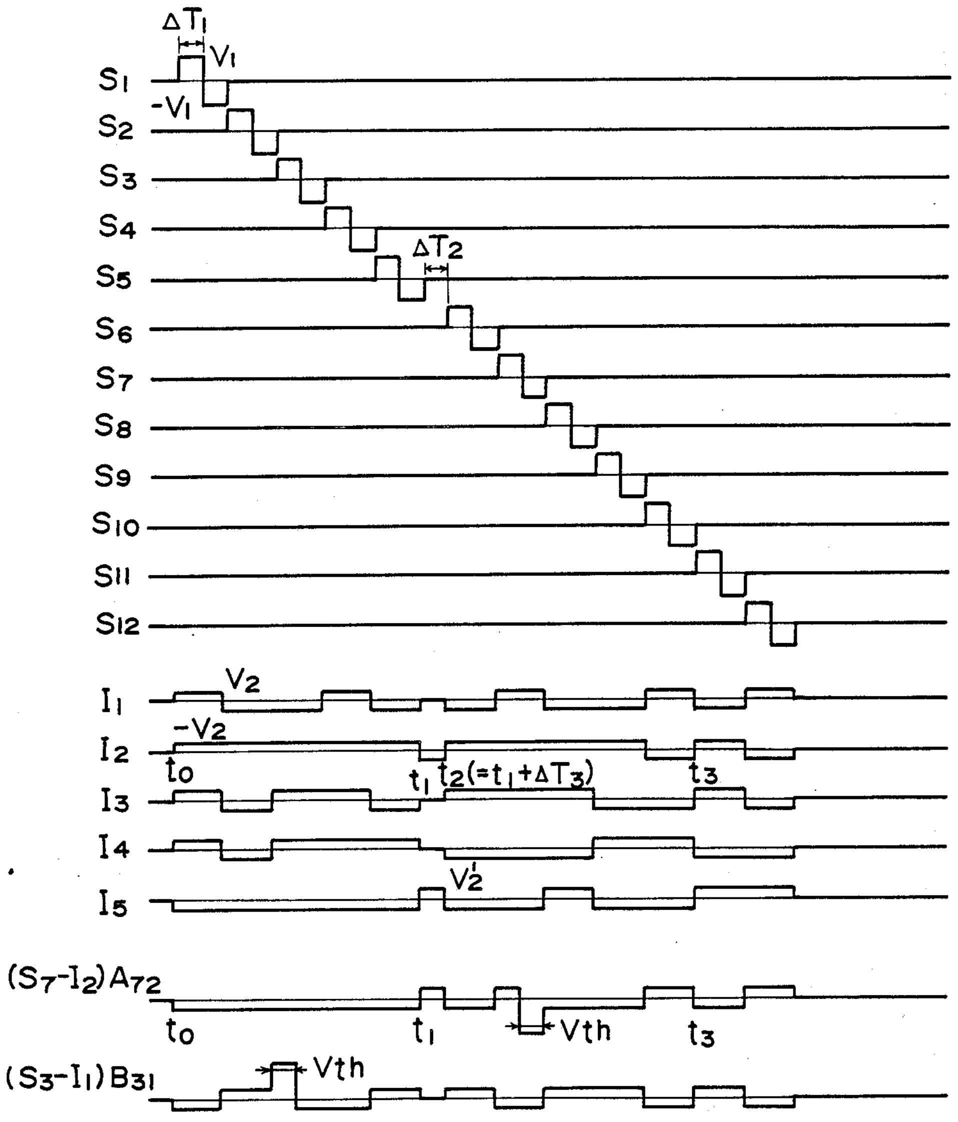
FIG. 5 is a time chart for another embodiment according to the present invention.
Figure 6:
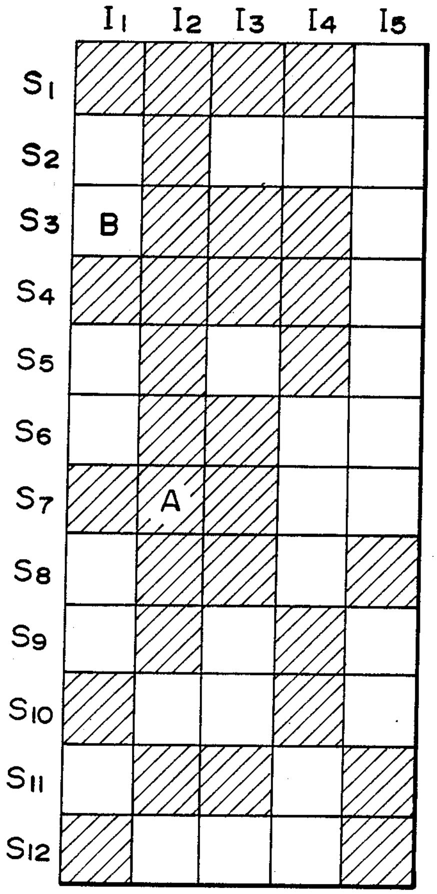
FIG. 6 is a plan view of a matrix panel.

FIG. 5 is a timing chart showing an example of line-sequential scanning according to a driving scheme of the present invention, and FIG. 6 is a plan view of an example of a matrix panel written by the scanning. Referring to FIGS. 5 and 6, $S_1$–$S_{12}$ indicate scanning signals applied to the corresponding scanning lines and $I_1$–$I_5$ indicate display signals applied to the corresponding signal lines. As shown in FIG. 5, the scanning signals $S_1$–$S_{12}$ are line-sequentially applied and the display signals $I_1$–$I_5$ are applied in synchronism with the scanning signals to provide a display state as shown in FIG. 6, wherein a hatched portion is assumed to be a picture element displaying "black" (first state) written by a positive electric field and a white portion is assumed to be a picture element displaying "white" (second state) written by a negative electric field. Picture elements A and B are taken as examples, and their locations are denoted by Aij and Bij, wherein the suffixes i and j mean that the picture element in question is on an i-th row and a j-th column. The voltage waveforms applied to picture elements $A_{33}$ and $B_{34}$ shown in FIG. 6 are shown at the lowermost portion of FIG. 5. The voltage values are calculated by subtracting a data signal Ij from a scanning signal Si, so that ($S_7$-$I_2$) for a picture element $A_7$ and ($S_3$-$I_1$) for $B_{31}$.

Now, in a scheme where the scanning signal lines $S_1$–$S_{12}$ are line-sequentially scanned and writing signals are simultaneously applied to the display signal lines $I_1$–$I_5$, when a pulse voltage of $V_1+V_2$ with a pulse duration of $\Delta T_1$ is used for writing, a voltage ($V_2$ or $-V_2$) as shown at $I_1$–$I_5$ is applied even to non-selected points (picture elements) as will be apparent from the voltage waveforms shown at $A_{72}$ and $B_{31}$ in FIG. 5. The voltage applied to the non-selected points is not uniform but is different according to a display state concerned. More specifically, for a signal column $I_2$ wherein 9 consecutive picture elements on the column are written in "black", a display signal voltage of $V_2$ is continually applied, while for a signal column $I_4$ on which several consecutive picture elements are written in "white", a negative voltage of $-V_2$ is continually applied. As a result, a reverse bias voltage of $+V_2$ or $-V_2$ is continually applied to respective elements on these columns for a long period other than the scanning selection period. The reverse voltage, when applied for a period exceeding a certain level, can destroy the display. For this reason, the application of the bias voltage should be interrupted by applying an auxiliary signal to picture elements based on those picture elements on signal columns such as $I_3$ and $I_4$ where the bias voltage is applied for a longest period. For example, if the tolerable time limit of a liquid crystal material used is ($t_1$-$t_0$) for the reverse bias voltage of $-V_2$ as shown in FIG. 5, this means that a time for writing 5 consecutive lines on a single column is an upper limit, and if one state is consecutively written in more than 5 picture elements on the same column, there is a possibility that the reverse bias voltage applied to the non-selected points is not tolerable. In order to dissolve this problem, such continuous application of a reverse bias voltage exceeding the tolerable limit may be obviated by detecting the display signal inputs and, if even one among the plurality of the display signal lines has received such signals as to provide the same display state for 5 consecutive picture elements on the line, applying an auxiliary signal to the display signal line or all the display signal lines. The auxiliary signal is applied to the panel while interrupting the application of a scanning signal. The auxiliary signal has different polarities between the instances where the relevant signal line has been consecutively written in "black" and where the relevant signal line has been consecutively written in "white", and also has an opposite polarity to that of the relevant bias voltage. Herein, if the same written state does not consecutively occur, it is possible to apply a null signal. The auxiliary signal used in this embodiment is a rectangular pulse having a pulse duration $\Delta T_2$ ($\geqq \Delta T_1$) and a pulse height $V_{2a}$ ($\geqq V_2$).

The tolerance limit of a reverse bias voltage application varies depending on a particular liquid crystal material and a particular cell used. In a case where DOBAMBC is incorporated in a cell having rubbed polyimide coating films inside thereof and a gap of about 1.8 μm and a writing pulse of 42 V (volts) and 2 ms (milliseconds) is used with a $\frac{1}{3}$ level (14 V) of a bias voltage, the tolerable limit for the reverse voltage (14 V) is of the order of 6 ms.

Figure 7:
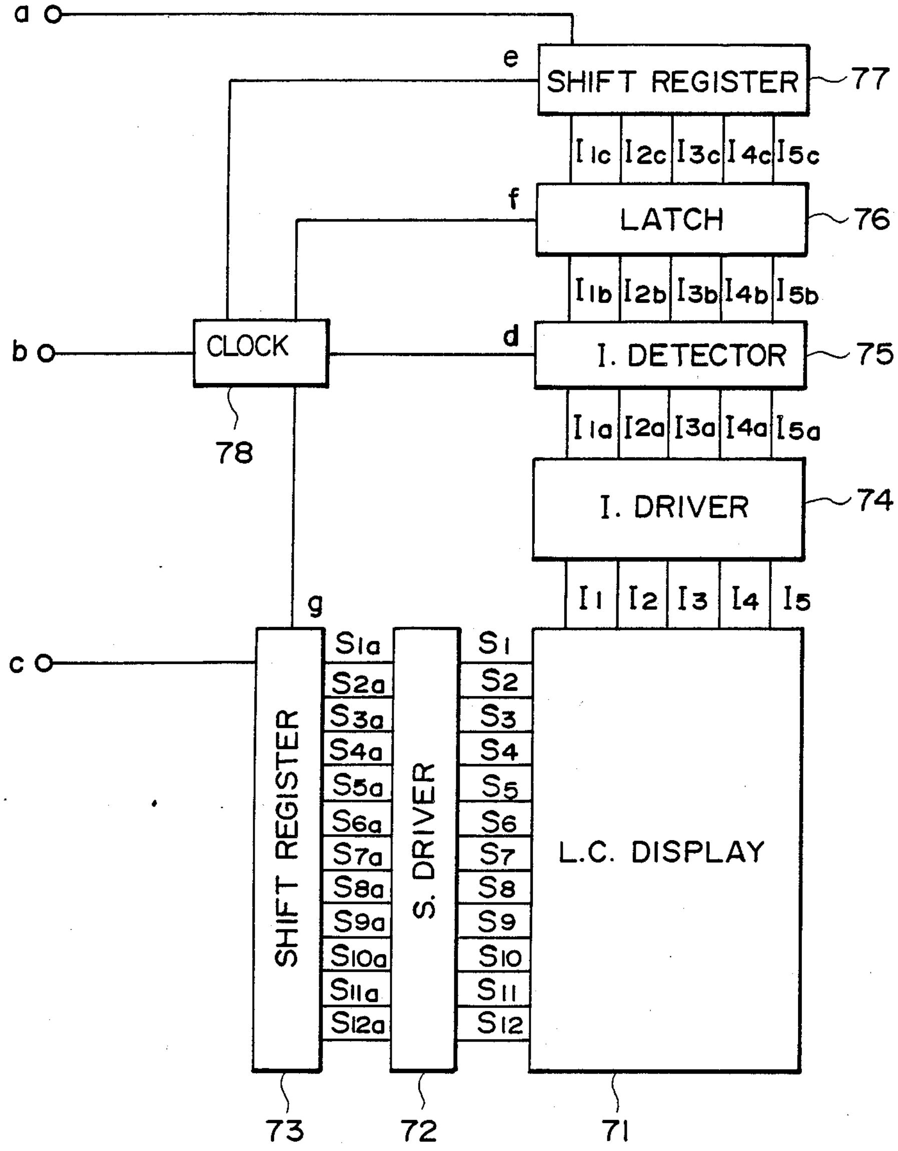
FIG. 7 is a block diagram of a circuit for driving the panel.

FIG. 7 is a block diagram of an embodiment of a driving circuit for the above described LCD panel of 5×12 picture elements shown in FIG. 6. In FIG. 7, $I_1$–$I_5$ and $S_1$–$S_{12}$ respectively correspond to the signals shown at the same symbols in FIG. 5 and the signal lines indicated by the same symbols shown in FIG. 6. Referring to FIG. 7, the driving circuit comprises an LCD panel 71, a scanning signal line driver (S-driver) circuit 72 connected to the LCD panel 71, a shift register 73 for controlling the line-sequential scanning thereof, a display signal line driver (I driver) 74, and an information continuous detector circuit 75 connected to a clock pulse generator circuit 78 through an interrupting line d. The shift register 73 is provided with a serial input terminal c and is connected to the clock pulse generator 78 through a terminal g. The driving circuit further comprises a latch 76 provided with a latch timing line f leading to the clock pulse generator circuit 78, a shift register 77 also connected to the clock pulse generator circuit 78 through a line e. To the clock pulse generator circuit 78 are supplied basic clock pulse inputs through a terminal b so as to control the clock pulse timing lines e, f and g.

Figure 8:
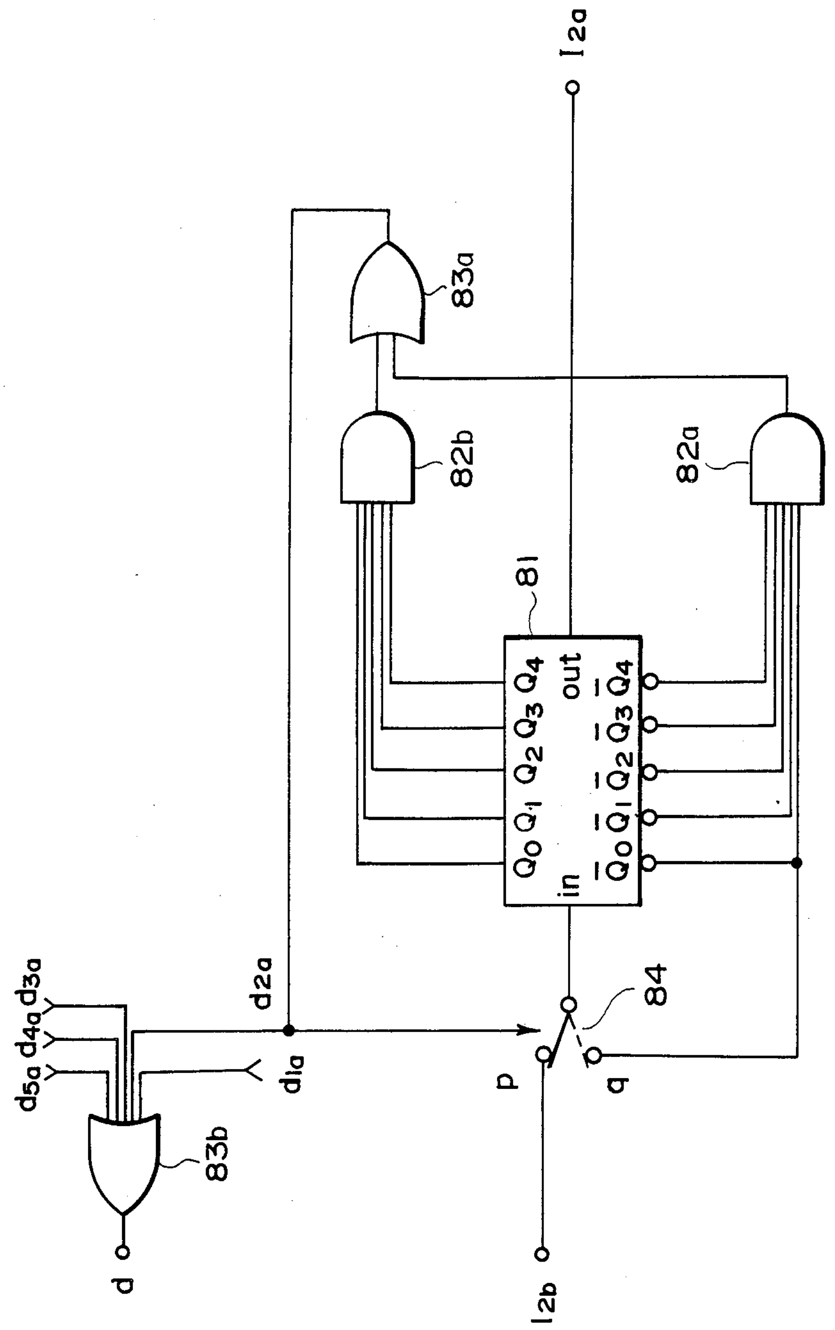
FIG. 8 is a view showing an information continuous detector circuit.
Figure 9:
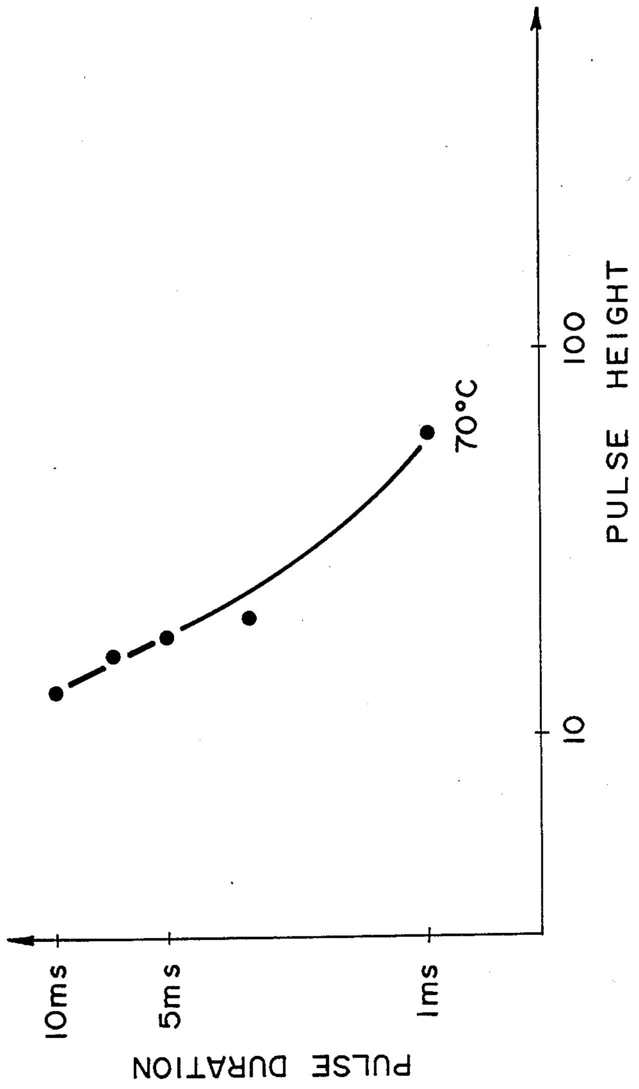
FIG. 9 is a graph showing a threshold characteristic of a FLC.

FIG. 8 shows the information continuous detection circuit 75 in more detail with respect to an information line $I_2$. Referring to FIG. 8, a shift register 81 receives a serial input in and issues a serial output out, outputs $Q_0, Q_1, \ldots, Q_4$ and reverse outputs $\overline{Q_0}, \overline{Q_1}, \ldots, \overline{Q_4}$ at respective stages. The continuous detector circuit further comprises AND gates 82*a* and 82*b*, OR gates 83*a* and 83*b*, and an input changeover switch 84 which is switched to a 9 position when the control line $d_{1a}$ is energized. FIG. 8 shows an example where one type of information is consecutively applied 5 times. When the input line $I_{2b}$ assumes the "1" state for 5 consecutive times, the AND gate 82*b* is opened and the output is passed through the OR gate 83*a* to change the switch over to the q-position. At this time, $Q_0$,i.e., "0" is supplied to the input in. At the same time, an interrupting signal is supplied through the OR gate 83*b* to the clock pulse generator circuit 78. Then, when $\overline{Q_0}$ supplied, the AND gate 82*b* is closed and the OR gate 83*a* is also closed to change the switch 84 over to the p position and also to release the interrupting signal through the OR gate 83*b*.

Further, when 5 consecutive information bits assume the "0" state, the AND gate 82a is opened, the switch 84 is changed over, and $\overline{Q_0}$, i.e., "1" is supplied.

In this way, when no change occurs in 5 consecutive information bits, a reverse information bit is applied to prevent the occurrence of crosstalk.

In this embodiment, the limit of the tolerable consecutive number of information bits of the same type has been set at 5, the limit may be determined depending on a particular liquid crystal used and other factors.

Further, it would be understood that the above operation may be realized by using other circuits than a particular circuit as described above within the teaching of the present invention.

Further, in the above embodiment, the auxiliary signal is applied to the display signal line side. Needless to say, such an auxiliary signal may alternatively be applied to the scanning signal line side or may be applied to both the display signal line side and the scanning signal line side in order to effect the driving method according to the invention.

As stated above, according to the present invention, there is provided a driving system for a ferroelectric liquid crystal device by which ferroelectric liquid crystal picture elements arranged in matrix of high density can be driven at a high speed while preventing a crosstalk phenomenon caused by inversion due to a reverse bias voltage exerted on nonselected points.

What is claimed is:

1. A ferroelectric liquid crystal apparatus comprising:

a ferroelectric liquid crystal device having a matrix electrode arrangement comprising a plurality of scanning lines and a plurality of data lines, and a ferroelectric liquid crystal disposed between the scanning lines and the data lines, a picture element being defined at each intersection of the scanning lines and the data lines;

first means for serially applying a scanning signal to said plurality of scanning lines and for applying in parallel data signals of a first voltage level and a given polarity to at least one selected data line of said plurality of data lines and data signals of a second voltage level at least one non-selected data line of said plurality of data lines;

second means for detecting data signals consecutively applied to said data lines by said first means and outputting a detection signal when consecutive data signals of the same voltage polarity, with respect to the second voltage level of one of said non-selected scanning lines, are applied to a particular data line; and third means for controlling said first means responsive to the detection signal so as to apply a voltage signal at the same level as the second voltage level and so as to apply an auxiliary signal of a voltage polarity opposite to the given polarity to said particular data line in synchronism with the voltage signal.

2. An apparatus according to claim 1, wherein said ferroelectric liquid crystal comprises a chiral smectic liquid crystal.

3. An apparatus according to claim 1, wherein said ferroelectric liquid crystal comprises a chiral smectic liquid crystal showing a first stable state and a second stable state in the absence of an applied electric field.

4. An apparatus according to claim 1, wherein said second means issue a detection signal when 5 consecutive data signals of the same type are applied to said particular data line.

* * * * *